R. SYMMONDS, Jr.
CLUTCH.
APPLICATION FILED MAY 3, 1909.
975,583.
Patented Nov. 15, 1910.
4 SHEETS—SHEET 4.
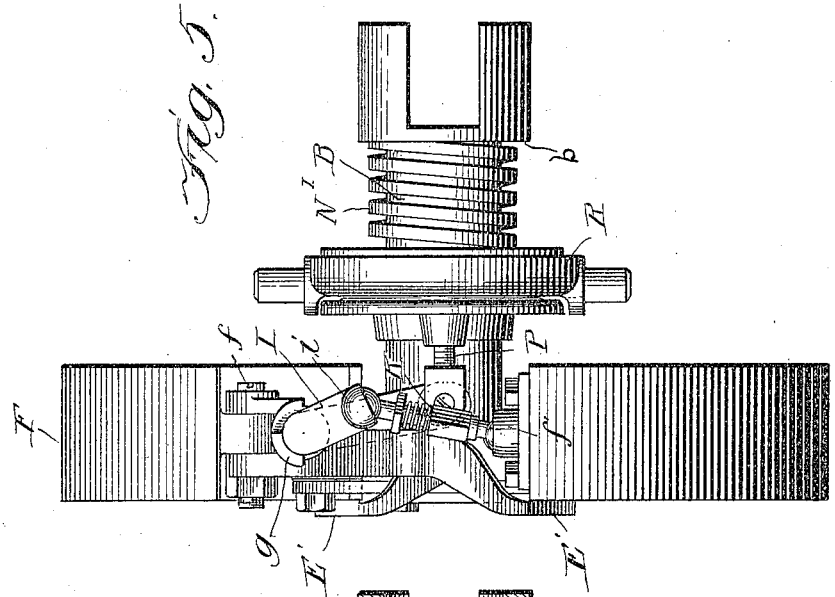
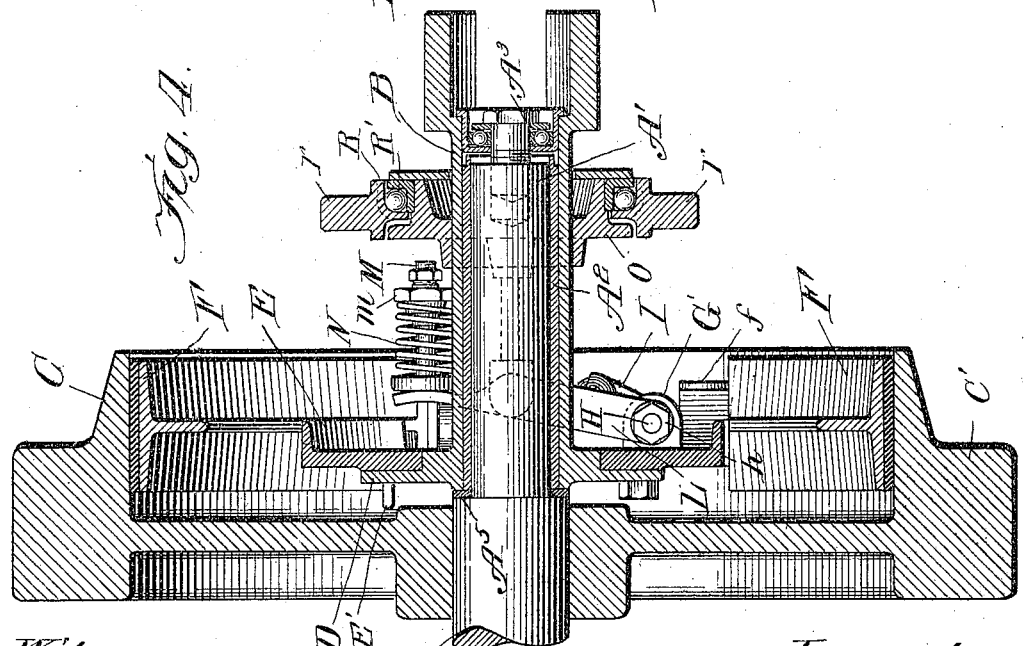
Witnesses:
Harry S. Gaither
[signature]
Inventor:
Robert Symmonds Jr
by Chamberlin & Freudenreich
Attys

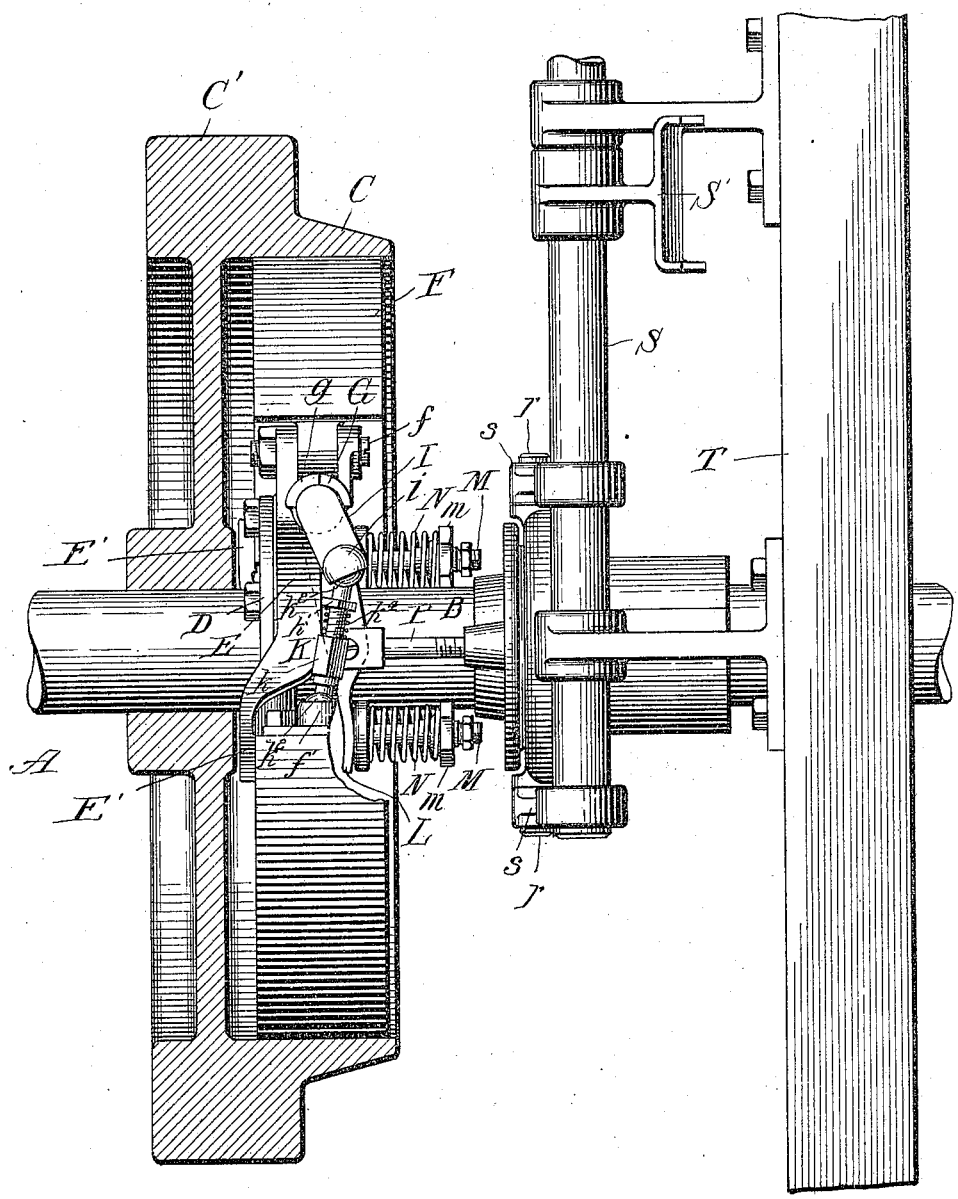

UNITED STATES PATENT OFFICE.

ROBERT SYMMONDS, JR., OF KENOSHA, WISCONSIN, ASSIGNOR, BY MESNE ASSIGNMENTS, TO KATE E. JEFFERY, CHARLES T. JEFFERY, AND HAROLD W. JEFFERY, EXECUTORS OF THOMAS B. JEFFERY, DECEASED.

CLUTCH.

975,583.  Specification of Letters Patent.  Patented Nov. 15, 1910.

Application filed May 3, 1909. Serial No. 493,501.

*To all whom it may concern:*

Be it known that I, ROBERT SYMMONDS, Jr., a citizen of the United States, residing at Kenosha, county of Kenosha, State of Wisconsin, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

My invention relates to clutches and has for its object to simplify and improve the construction and operation thereof.

Figure 1:
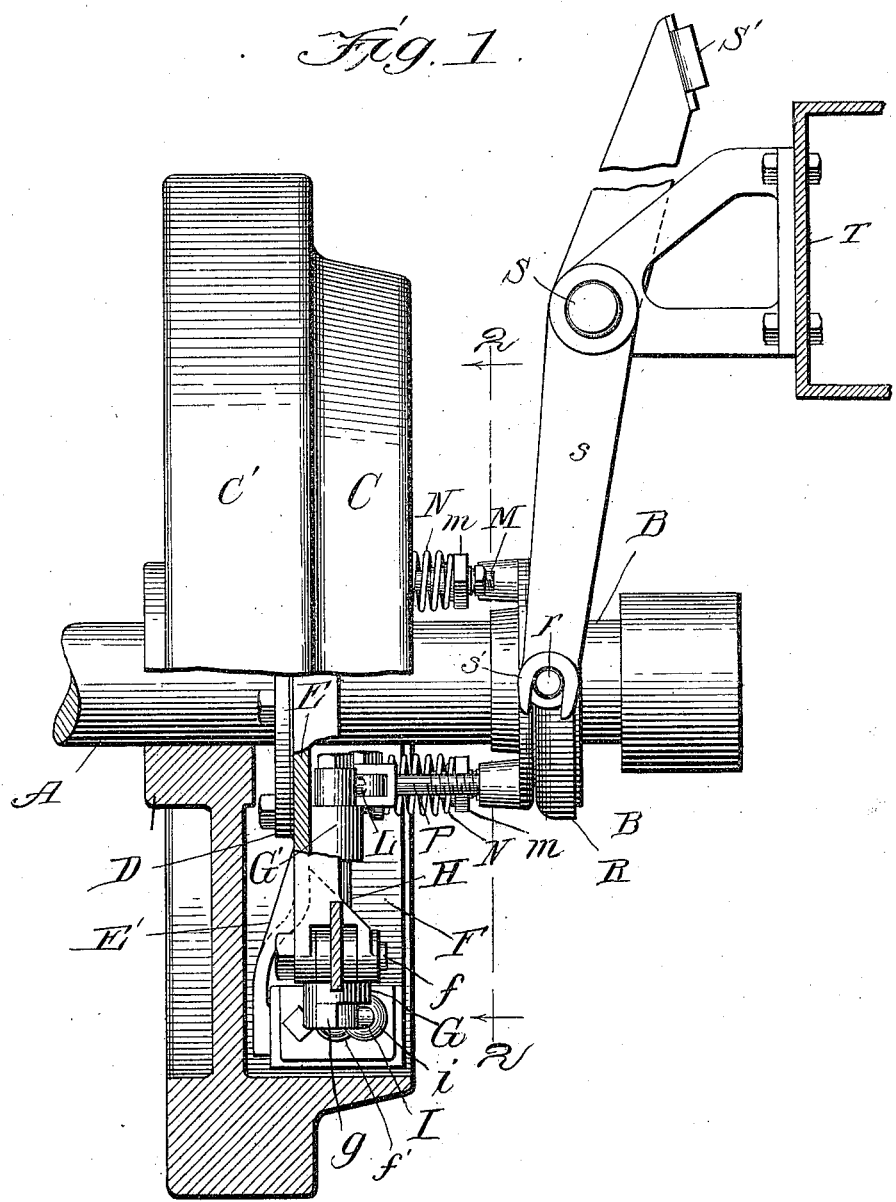
Figure 2:
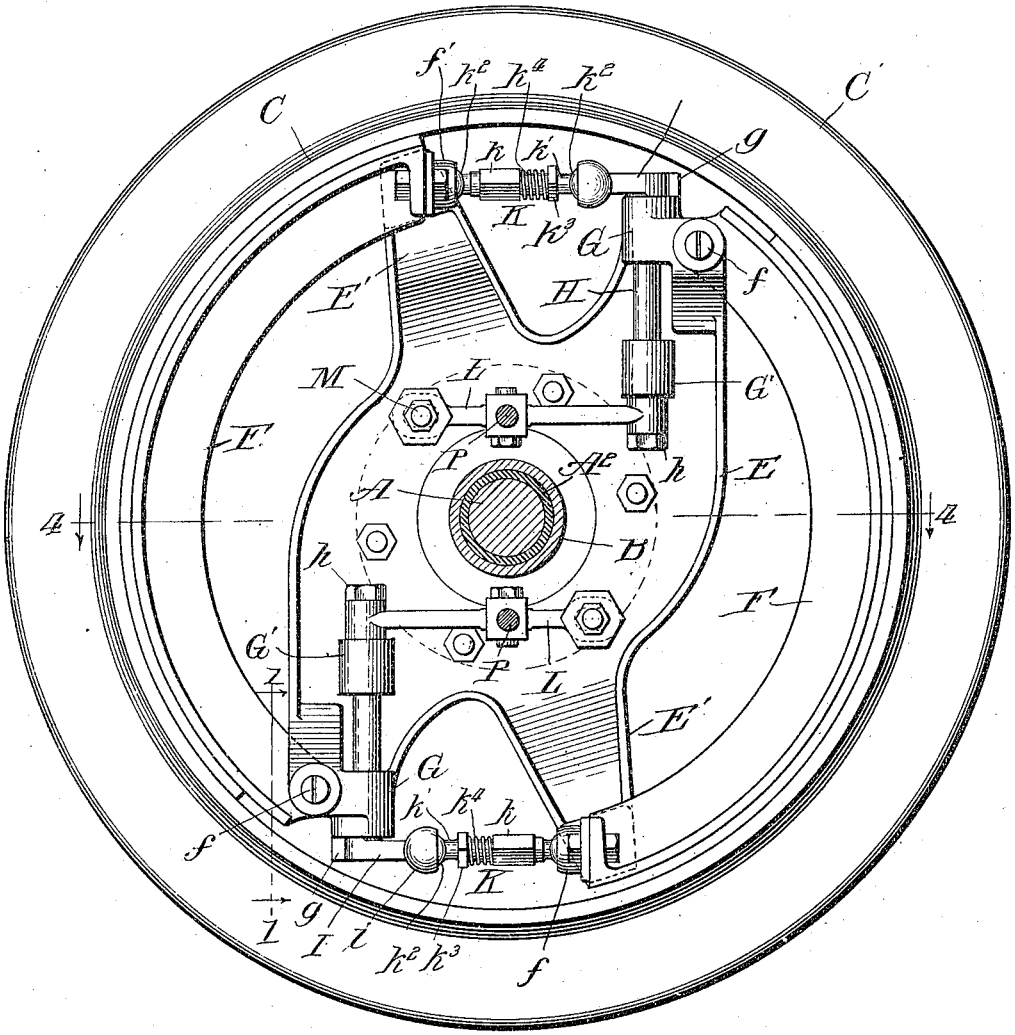

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a view partly in side elevation and partly in section of my improved clutch, the friction shoe which is visible being cut away on lines 1—1 of Fig. 2; Fig. 2 is a section taken on line 2—2 of Fig. 1, looking in the direction of the arrows; Fig. 3 is a top plan view, the fly wheel and clutch drum being shown in section; Fig. 4 is a section on line 4—4 of Fig. 2; and Fig. 5 is a plan view showing a slightly modified form of one of the clutch members.

Referring to the drawings, A represents a driving member and B a driven member. The clutch illustrated is particularly adapted for connecting the engine shaft of an automobile to the transmission shaft and therefore the drum member C of the clutch may be mounted in any suitable way upon the engine shaft, which in this case is the driving member. The clutch drum is illustrated as forming part of the fly wheel $C^1$. The member B may conveniently be in the form of an elongated sleeve surrounding a reduced portion $A^1$ of the driving shaft. An anti-friction bushing $A^2$ may be placed between the shaft and the sleeve to take the wear and reduce the resistance to relative rotation between the sleeve and the shaft. Relative endwise movement between the shaft and the sleeve may be prevented by means of a suitable thrust bearing $A^3$. The member B is provided at one end with an annular flange D to which is bolted, or otherwise secured, a spider E which lies within the clutch drum.

In accordance with my invention I mount upon the spider one or more friction shoes of any suitable type and provide a simple and effective actuating means for the shoe or shoes. In the particular arrangement shown there are two of these shoes, F, each of which is hinged at one end to the spider as at $f$. While it is not essential that the shoe or shoes be hinged to the spider, I prefer this arrangement over one in which the capacity of movement of the shoe or shoes is afforded by the resiliency thereof, since it permits the shoes to be made rigid and powerful. Journaled within the bosses G and $G^1$ integral with the spider are a pair of rock shafts H. Upon the outer end of each rock shaft is a crank arm I preferably, though not necessarily, integral therewith.

A pair of links K connect the ends of the crank arms I with the free ends of the shoes; the arrangement being such that the crank arms form obtuse angles with the links so that upon turning the rock shafts to increase these angles, a powerful thrust is imposed upon the shoes and they are forced with great pressure against the interior of the drum. The bosses G are preferably provided with integral outwardly-projecting arc-shaped shoulders or lugs $g$ engaging with the inner ends of the crank arms I and taking the end thrust thereon. The links K are preferably made adjustable in order to permit the shoes to be nicely adjusted relative to the coöperating drum and also to permit compensation for wear. The adjustability of the links may be brought out in various ways as, for example, by making each link of two members $k$ and $k^1$, the member $k^1$ being screw-threaded into the member $k$. The pivotal connection between the ends of the links and the parts with which the links coöperate may be effected in any suitable manner, but I prefer to make use of ball and socket joints for this purpose in order to provide extreme flexibility. To this end each of the crank arms I is provided at its end with a socket $i$ and on the free end of each shoe is formed a similar socket $f^1$. Balls $k^2$ on the ends of the link members fit in these sockets and form therewith universal joints. In order to prevent relative angular movements between the parts of the links, I place under tension between a shoulder $k^3$ on each of the members $k^1$ and the ends of the coöperating member $k$ a spring $k^4$. The friction between the ends of the spring and the abutting surfaces is sufficient to lock the members $k$ and $k^1$ against relative angular displacement under ordinary conditions.

The parts are so proportioned that the rock shafts extend inwardly transversely of the axis of the clutch. At the inner ends of the rock shafts are crank arms L. In case the crank arms I are made integral with the rock shafts, the arms L should be made detachable so that the rock shafts may be placed in position and then locked against displacement by adding the inner crank arms. In the arrangement shown, the detachable crank arms are held in place by means of nuts $h$ arranged upon the inner ends of the rock shafts. It will be seen that by properly proportioning the parts, a tightening of the nuts $h$ draws the crank arms I and L against the lugs G and $G^1$, respectively, so that the rock shafts are held against endwise movement but are free to rotate. Two of the bolts M which secure the spider to the flange may be extended so as to project through the free ends of the crank arms L. Between adjustable shoulders $m$ on the outer ends of these bolts and the crank arms through which the bolts project are arranged springs N of sufficient tension to hold the shoes against the coöperating friction surface with the desired pressure when free to do so. In other words, the clutching engagement of the shoes is effected by means of the springs acting upon the rock shafts. It will, of course, be understood that the springs need not be associated with the rock shafts in precisely the manner illustrated and described, since the structural details of the spring actuating mechanism may, of course, be varied Slidably mounted upon the member B is a sleeve O, and this sleeve is connected to each of the crank arms L by means of links P. It will be seen that by shifting the sleeve toward the right in Fig. 1, or in Fig. 4, the rock shafts will be rotated against the tension of the springs, causing the angle between the members I and K to be diminished and the shoes to be drawn out of engagement with the drum. The sleeve may be controlled in any suitable manner. In the arrangement shown there is a ring R surrounding the sleeve and revolubly supported thereon by means of a ball bearing $R^1$. This bearing is so constructed and arranged as to take also the thrust in the axial direction so as to avoid the interposition of frictional resistance to the shifting of the sleeve by the ring. The ring has two projecting trunnions $rr$ diametrically opposed to each other, and these are adapted to be engaged in forks $s$ in the ends of the usual shifting arms $s^1$ which are in turn carried by an oscillating shaft S journaled in a part of the automobile frame T and provided with the usual foot lever $S^1$.

Normally the springs N hold the friction shoes in engagement with the interior of the clutch drum. When it is desired to release the clutch, the foot lever $S^1$ is actuated and the shoes are withdrawn against the tension of the springs. Slipping in the axial direction is prevented on the one hand by the shoulder $A^5$ at the inner end of the reduced portion of the engine shaft and on the other hand by the thrust bearing $A^3$.

When the rock shafts are actuated to carry the shoes into engagement with the drum a thrust in the direction of the axis of the clutch is imposed upon the free ends of the shoes due to the angular positions of the links K. In order to make it unnecessary for the hinges to bear the side strains produced by such thrusts, I provide the spider E with a pair of arms $E^1$ which extend outwardly past the sides of the free ends of the friction shoes and afford rigid abutments against which the ends of the shoes may bear and so relieve the hinges.

In Fig. 5, I have shown a slight modification in which the parts are the same as those previously described except that the actuating springs are not associated directly with the crank arms $L^1$, there being instead, a single spring $N^1$ arranged between a shoulder $b$ on the member B and the sleeve O. In this instance the links P' may be shorter than the links P with which they correspond and therefore no change need be made in the member B.

While I have illustrated and described with particularity only the best form of my invention known to me I do not desire to be limited to the structural details so illustrated and described, but intend to cover all forms falling within the terms of the definitions of my invention constituting the appended claims.

What I claim is:

1. In a clutch, a drum, a spider adjacent to said drum, a friction shoe lying in proximity to said drum and connected at one end to said spider, a rock shaft journaled on said spider and extending transversely of the axis of said drum with one end lying adjacent to the free end of said shoe and the other end extending toward said axis, actuating means for said shoe arranged between the free end thereof and the adjacent end of the rock shaft, and means for oscillating said shaft.

2. In a clutch, a drum, a spider adjacent to said drum, a friction shoe lying in proximity to said drum and connected at one end to said spider, a rock shaft journaled on said spider and extending transversely of the axis of said drum with one end lying adjacent to the free end of said shoe and the other end extending toward said axis, a crank arm on the outer end of the rock shaft, a connecting member between said crank arm and the free end of said shoe, and means for oscillating said rock shaft.

3. In a clutch, a drum, a revoluble member, a friction shoe movably mounted on said member in position to be carried into and out of engagement with said drum, a rock shaft extending inwardly from a point adjacent to said drum toward said member, crank arms on said rock shaft, a connection between one of the said arms and said friction shoe, a sleeve mounted on said member so as to be slidable axially thereof, a connection between said sleeve and the other crank arm, and means for actuating said sleeve.

4. In a clutch, a drum, a revoluble member having a spider extending into the drum, a friction shoe mounted on said spider so as to be movable into and out of engagement with the interior of said drum, a rock shaft mounted on said spider and extending inwardly from a point adjacent to said drum toward the axis of said member, crank arms on said shaft, a link connected at its ends with said shoe and with one of the said crank arms and forming therewith an obtuse angle, and means coöperating with the other of said crank arms for rocking said shaft.

5. In a clutch, a drum, a revoluble member having a spider extending into the drum, a friction shoe mounted on said spider on one side of said member so as to be movable into and out of engagement with the interior of said drum, a rock shaft mounted on said spider on the opposite side of said member and extending transversely of the axis of said member, crank arms on said shaft, a link connected at its ends with said shoe and with one of the said crank arms and forming therewith an obtuse angle, a sleeve mounted on said member so as to be slidable axially thereof, a connection between said sleeve and the other crank arm, and means for actuating said sleeve.

6. In a clutch, a drum, a revoluble member having a spider projecting into proximity to said drum, a friction shoe mounted on said spider on one side of said member so as to be movable into and out of engagement with said drum, a rock shaft supported on said spider on the opposite side of said member and extending transversely of the axis of said member, a crank arm on said shaft, a link extending between said crank arm and said shoe and forming with said crank arm an obtuse angle, and means for actuating said rock shaft including a spring for rotating it in one direction.

7. In a clutch, a drum, a revoluble member having a spider projecting into proximity to said drum, a friction shoe mounted on said spider on one side of said member so as to be movable into and out of engagement with said drum, a rock shaft supported on said spider on the opposite side of said member and extending transversely of the axis of said member, a crank arm on said shaft, a link extending between said crank and said shoe and forming with said crank arm an obtuse angle, a second crank arm on said rock shaft, a spring engaging said second crank arm for normally holding the rock shaft in a position wherein it causes the friction shoe to be engaged with the drum, a sleeve slidably mounted on said member, a connection between said sleeve and said second crank arm, and means for actuating said sleeve.

8. In a clutch, a drum, a revoluble member, a friction shoe mounted on said member in position to be moved into and out of engagement with said drum, a rock shaft mounted on said member so as to extend transversely of the axis thereof, and have one end projecting into proximity to said drum and the other end projecting into proximity to said member, a crank arm on the outer end of said shaft, an adjustable link connecting said crank arm with said shoe and forming with the crank arm an obtuse angle, and means for rocking said shaft.

9. In a clutch, a revoluble member, a movable friction shoe mounted on said member, a rock shaft journaled on said member so as to extend transversely of the axis thereof, a crank arm on the outer end of said shaft, and a link extending between said shoe and said crank arm and forming with the latter an obtuse angle, said member having a curved boss engaging with the end of the crank arm connected with the rock shaft so as to take the end thrust of said arm.

10. In a clutch, a revoluble member, a movable friction shoe mounted on said member, a rock shaft journaled on said member so as to extend transversely of the axis thereof, a crank arm on the outer end of said shaft, and an adjustable link extending between said shoe and said crank arm and forming with the latter an obtuse angle, said member having a curved boss engaging with the end of the crank arm connected with the rock shaft so as to take the end thrust of said arm.

11. In a clutch, a revoluble member, a spider on said member, a movable friction shoe connected at one end to said spider, bosses on one side of said spider, a rock shaft journaled in said bosses, a crank arm on the outer end of said shaft, a curved shoulder on the outer of said bosses partially surrounding the end of the arm adjacent to the shaft, and a link connecting said crank arm with the free end of said shoe.

12. In a clutch, a revoluble member having an annular flange projecting therefrom, a spider secured to said flange, a friction shoe connected at one end to said spider, bosses projecting from one side of the spider, a rock shaft journaled in said bosses, a crank arm on the outer end of said shaft overlying and engaging with the outer of the bosses, and a link extending between the crank arm and the free end of the shoe and forming with the crank arm an obtuse angle.

13. In a clutch, a revoluble member having an annular flange projecting therefrom, a spider secured to said flange, a friction shoe connected at one end to said spider, bosses projecting from one side of the spider, a rock shaft journaled in said bosses, a crank arm on the outer end of said shaft overlying and engaging with the outer of the bosses, a link extending between the crank arm and the free end of the shoe forming with the crank arm an obtuse angle, and said outer boss having a shoulder engaging with the end of the crank arm adjacent to the shaft for taking the end thrust upon the arm.

14. In a clutch, a revoluble member, a spider on said member, a pair of friction shoes arranged on opposite sides of said member and each connected at one end to said spider, a pair of rock shafts journaled in said spider so as to extend transversely to the axis of said member, crank arms on the outer ends of said rock shafts, links connecting said arms with the free ends of said shoes, and means for simultaneously rocking said shafts.

15. In a clutch, a revoluble member, a spider on said member, a pair of friction shoes arranged on opposite sides of said member and each connected at one end to said spider, a pair of rock shafts journaled in said spider so as to extend transversely to the axis of said member, crank arms on the outer ends of said rock shafts, links connecting said arms with the free ends of said shoes, and means for simultaneously rocking said shaft, said means including a spring for actuating said shaft in one direction.

16. In a clutch, a revoluble member, a spider on said member, a friction shoe connected at one end to said spider, a rock shaft journaled on said spider so as to extend transversely of the axis of said member, crank arms on the inner and outer ends of said shaft, a link connecting the outer crank arm with the free end of said shoe, a rod extending from said spider past the inner crank arm, and a spring on said rod engaging with the side of said inner arm more remote from said spider.

In testimony whereof, I sign this specification in the presence of two witnesses.

ROBERT SYMMONDS, Jr.

Witnesses:
Ed. Dixon,
Charles T. Abbott.